US006185524B1

(12) United States Patent
Carus et al.

(10) Patent No.: US 6,185,524 B1
(45) Date of Patent: Feb. 6, 2001

(54) METHOD AND APPARATUS FOR AUTOMATIC IDENTIFICATION OF WORD BOUNDARIES IN CONTINUOUS TEXT AND COMPUTATION OF WORD BOUNDARY SCORES

(75) Inventors: Alwin B. Carus, Burlington, MA (US); Kathleen Good, Providence, RI (US)

(73) Assignee: Lernout & Hauspie Speech Products N.V., Ieper (BE)

( * ) Notice: Under 35 U.S.C. 154(b), the term of this patent shall be extended for 0 days.

(21) Appl. No.: 09/223,959

(22) Filed: Dec. 31, 1998

(51) Int. Cl.$^7$ ................................................. G06F 17/27
(52) U.S. Cl. .............................................................. 704/9
(58) Field of Search ............................... 704/1, 9, 10, 8, 704/251, 252, 253, 254, 255, 256, 257; 707/530, 531, 532, 533; 341/28; 382/185

(56) References Cited

U.S. PATENT DOCUMENTS

| | | | |
|---|---|---|---|
| 4,750,122 | 6/1988 | Kaji et al. ................................. | 704/1 |
| 5,029,084 | 7/1991 | Morohasi et al. ......................... | 704/9 |
| 5,040,218 | * 8/1991 | Vitale et al. ........................... | 704/260 |
| 5,146,405 | * 9/1992 | Church .................................... | 704/9 |
| 5,448,474 | 9/1995 | Zamora .................................... | 704/9 |
| 5,488,719 | * 1/1996 | Kaplan et al. ........................ | 707/100 |
| 5,721,939 | 2/1998 | Kaplan .................................... | 704/9 |
| 5,806,021 | 9/1998 | Chen et al. .............................. | 704/9 |
| 5,926,784 | * 7/1999 | Richardson et al. ...................... | 704/9 |
| 5,949,961 | * 9/1999 | Sharman .............................. | 704/269 |
| 5,960,385 | * 9/1999 | Skiena et al. ............................ | 704/9 |
| 5,999,896 | * 12/1999 | Richardson et al. ..................... | 704/9 |
| 6,035,268 | * 3/2000 | Carus et al. .............................. | 704/9 |

OTHER PUBLICATIONS

Harry Tennant: "Case Study: The Chart Parser", Natural Language Processing, Petrocelli book, New York/Princeton Press, pp. 75–101, 1981.*

Bates, et al.: "Recognizing Substrings of LR(k) Languages in Linear Time", ACM Transactions on Programming Languages and Systems, vol. 16,No. 3, pp. 1051–1077, May 1994.*

EL Guedjo, P.O., et al.:"A Chart parser to Analyze Large Medical Corpora", Proceedings of the 16th Annual Inter. Conf. of IEEE Eng. in Med. & Biol. Soc., vol. 2, pp. 1404–1405, Nov. 1994.*

"Efficient String Matching: An Aid to Bibliographic Search", Aho and Corasick, Bell Laboratories, Communications of the ACM, Jun. 1975, vol.18, No. 6, pp. 333–340.

"The N–Best Algorithm: An Efficient and Exact Procedure for Finding The N Most Likely Sentence Hypotheses", Schwartz et al., BBN Systems and Technologies Corp., 1990 IEEE.

"A Statistical Method for Finding Word Boundaries in Chinese Textp", Sproat and Shih, Computer Processing of Chinese & Oriental Languages, vol. 4, No. 4, Mar. 1990.

"A Stochastic Finite–State Word–Segmentation Algorithm For Chinese", Sproat et al., $32^{nd}$ Annual Meeting of the Association for Computational Linguistics, (Jun. 27, 1994, Las Cruces, New Mexico,) (1994).

"An Efficient and Complete Algorithm for Unambiguous Word Boundary Identification", Jin, G., http://sunzi.iss-.nus.sg:1996/guojin/papers/acbci/acbci.html.

* cited by examiner

Primary Examiner—Joseph Thomas
(74) Attorney, Agent, or Firm—Bromberg & Sunstein LLP

(57) ABSTRACT

A method and device for identifying word boundaries in continuous text compares the continuous text to a set of varying length strings to identify candidate word-initial boundaries and candidate word-final boundaries in the continuous text. Each candidate word-initial boundary and candidate word-final boundary has an associated probability value. Each candidate word boundary in the continuous text is identified by calculating a word boundary score for such candidate word boundary using the probability values associated with the candidate word-initial boundaries and candidate word-final boundaries. The set of varying length strings may include words and n-grams.

20 Claims, 6 Drawing Sheets

METHOD AND APPARATUS FOR AUTOMATIC IDENTIFICATION OF WORD BOUNDARIES IN CONTINUOUS TEXT AND COMPUTATION OF WORD BOUNDARY SCORES

TECHNICAL FIELD

The present invention relates to the identification of word boundaries in continuous text.

BACKGROUND ART

The identification of word boundaries in continuous text is used in several areas such as word processing, text processing, machine translation, fact extraction, and information retrieval. Prior art methods for identifying word boundaries have used various approaches including whole words; word-initial and word-final n-grams and their frequencies; or a hidden Markov model of n-grams, word boundaries and their frequencies.

The article J. Guo, "An Efficient and Complete Algorithm for Unambiguous Word Boundary Identification", formerly found at http://sunzi.iss.nus.sg:1996/guojin/papers/acbci/acbci.html and as referenced in J. Guo, A Comparative Experimental Study on English and Chinese Word Boundary Ambiguity," Proceedings of the International Conference on Chinese Computing 96 (ICC 96) June 4–7, 1996 Singapore (National University of Singapore, Singapore), pp. 50–55, discloses a method which uses whole words implemented by an Aho-Corasick finite-state automaton. Another prior art method which uses a dictionary of whole words is U.S. Pat. No. 5,448,474, "Method for isolation of Chinese words from connected text". The foregoing references are herein incorporated by reference. A disadvantage to methods using whole words or entire vocabularies is the amount of storage space required. In addition, only words included in the dictionary may be identified. Finally, it is not possible to rank or order competing possible word boundary candidates or to establish the best word boundary among competing possible word boundary candidates.

Several methods have attempted to overcome the problems presented by using a dictionary of whole words. In U.S. Pat. No. 5,806,021, "Automatic Segmentation of Continuous Text Using Statistical Approaches," Chen et. al., a method is disclosed which uses two statistical methods. First, forward and backward matching is performed using a vocabulary with unigram frequencies. Then, a score is calculated using statistical language models. Another prior art method uses a combination of rules, statistics and a dictionary. (See U.S. Pat. No. 5,029,084, "Japanese Language Sentence Dividing Method and Apparatus", Morohasi et. al.) The foregoing references are herein incorporated by reference.

SUMMARY OF THE INVENTION

In accordance with an embodiment of the invention, a method for identifying word boundaries in continuous text comprises: (a) comparing the continuous text to a set of varying length strings to identify candidate word-initial boundaries and candidate word-final boundaries in the continuous text, each candidate word-initial boundary and candidate word-final boundary having an associated probability value and (b) identifying each candidate word boundary in the continuous text by calculating a word boundary score for such candidate word boundary using the probability values associated with the candidate word-initial boundaries and candidate word-final boundaries identified in step (a). The set of varying length strings may include words. In a preferred embodiment, the set of varying length strings includes words and n-grams. In a further preferred embodiment for the English language, the words are one and two character words and the n-gams are trigrams.

In another embodiment, the probability value associated with a candidate word-initial boundary is the probability that the string, beginning with the candidate word-initial boundary, begins a word. The probability value associated with a candidate word-final boundary is the probability that the string, ending with the candidate word-final boundary, ends a word. In a further embodiment, the method further includes verifying each segment defined by the candidate word boundaries identified in step (b) against a string database.

In accordance with a further embodiment of the invention, a device for identifying word boundaries in continuous text comprises a string comparator, to identify candidate word-initial boundaries and candidate word-final boundaries in the continuous text by comparing the continuous text to a set of varying length strings, each candidate word-initial boundary and candidate word-final boundary having an associated probability value and a boundary checker, coupled to the string comparator, to identify each candidate word boundary in the continuous text by calculating a word boundary score for such candidate word boundary using the probability values associated with the candidate word-initial boundaries and candidate word-final boundaries identified by the string comparator. In another further embodiment, the device further comprises a string database and a chart parser, coupled to the boundary checker, to verify each segment defined by the candidate word boundaries identified by the boundary checker against the string database.

The set of varying length strings may include words. In a preferred embodiment, the set of varying length strings includes words and n-grams. In a further preferred embodiment for the English language, the words are one and two character words and the n-grams are trigrams. In another embodiment, the probability value associated with a candidate word-initial boundary is the probability that the string, beginning with the candidate word-initial boundary, begins a word. The probability value associated with a candidate word-final boundary is the probability that the string, ending with the candidate word-final boundary, ends a word.

In accordance with another further embodiment, a digital storage medium encoded with instructions which, when loaded into a computer, may establish any of the devices previously discussed.

BRIEF DESCRIPTION OF THE DRAWINGS

The present invention will be more readily understood by reference to the following detailed description taken with the accompanying drawings, in which.

DETAILED DESCRIPTION OF SPECIFIC EMBODIMENTS

FIGS. 1A-1E are block diagrams of a flow chart of the method of identifying word boundaries in continuous text in accordance with an embodiment of the invention. The method of identifying word boundaries may be used in natural language processing applications such as word processing, text processing, machine translation, fact extraction, and information retrieval. The method may be used for any natural language. For example, the method may be used to identify words contained in user names or URLs. In a preferred embodiment of the invention, the method is used to identify vulgar, obscene and offensive words in user names and URLs.

The method of identifying word boundaries may use words of any length and their associated probabilities or a combination of both words of any length and n-grams of varying length and their associated probabilities. In this description and the following claims the varying length words and n-grams are collectively referred to as "strings." In one embodiment, all words in a natural language may be used in combination with n-grams. In yet another embodiment, only the most frequently occurring words in a natural language may be used in combination with n-grams. In a preferred embodiment for the English language, one- and two-character words are used in combination with trigrams. In the preferred embodiment for the English language, the use of varying length strings, as opposed to only whole words or uniform n-grams, allows for the identification of more candidate word boundaries in the continuous text. In addition, it is possible to identify boundaries for words which may not be known. The method of identifying word boundaries as described in this description and the following claims is language independent.

Figure 1A:
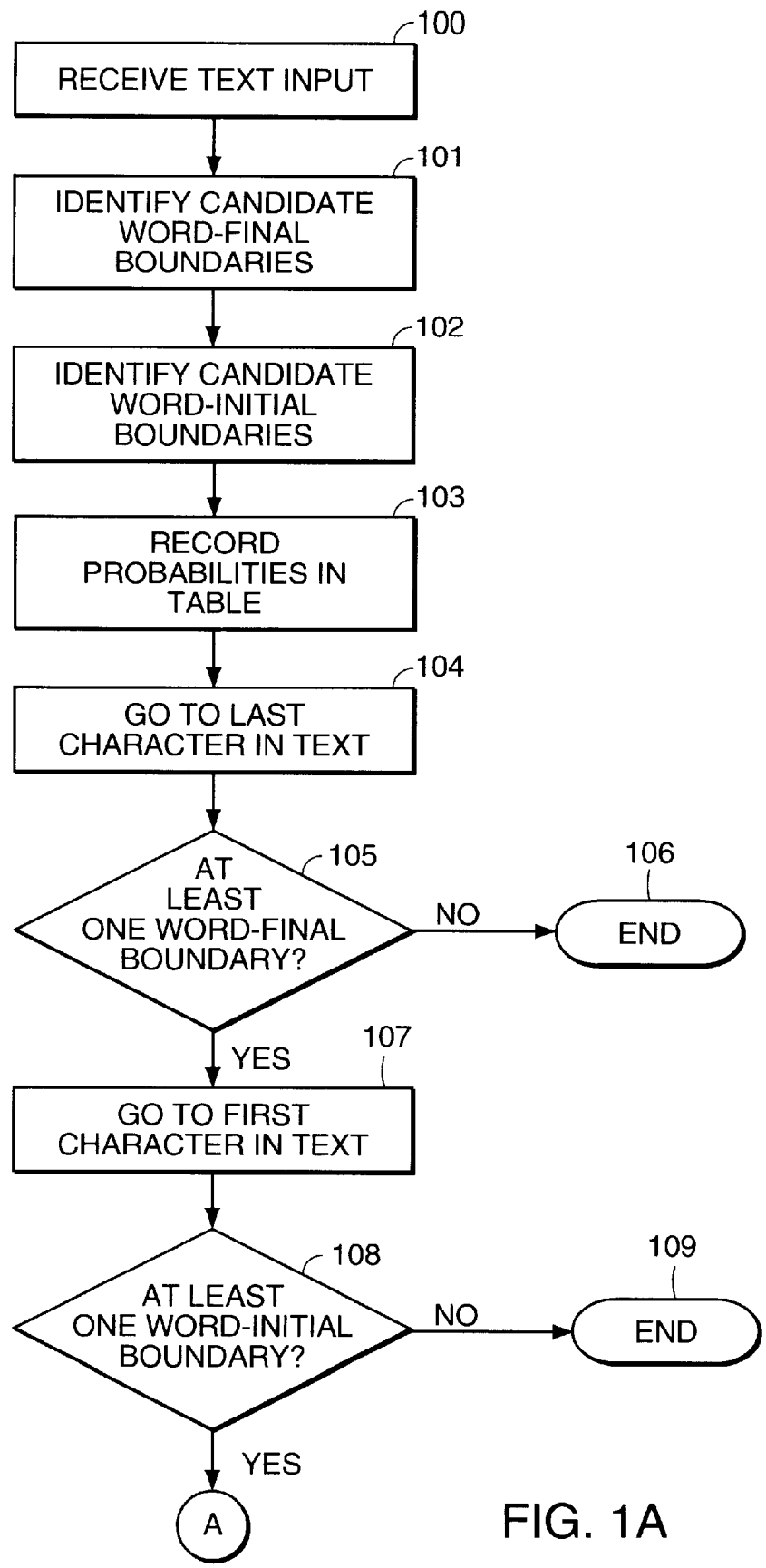
FIGS. 1A–1E are block diagrams showing a flow chart of the method for identifying word boundaries in accordance with a preferred embodiment of the invention.

In FIG. 1A in step 100, the text input is received and then processed to identify candidate word-final boundaries in step 101 and candidate word-initial boundaries in step 102. A "candidate word-final boundary" is a character which may end a word and a "candidate word-initial boundary" is a character which may begin a word. In steps 101 and 102, the candidate word-final boundaries and candidate word-initial boundaries are identified by matching the text against a stored list of strings (words and n-grams). In particular, a current character in the text together with a number (which may be zero) of immediately preceding characters is matched against the stored list of strings.

Stored with each string is a set of probabilities. In a preferred embodiment, the set of probabilities for each string has two members: (I) the probability the string begins a word and; (ii) the probability the string ends a word. In a preferred embodiment, the strings and their associated probabilities are implemented as a single Aho-Corasick finite state automaton (FSA) model (see Aho, V., Corasick, M. J., "Efficient String Matching: An Aid to Bibliographic Search," *Communications of the ACM*, 18(6) (1975), pp. 333–340, herein incorporated by reference). The FSA model contains all valid beginning and ending n-grams, as well as words of any length, along with information about the probability that these strings end and begin a word. These probabilities are used to compute candidate word boundaries within the continuous text. By using the probability information, it is possible to rank and order competing candidate word boundaries and establish the best word boundary among competing candidate word boundaries.

Each successive character of text is subject to analysis to produce probability values. When a string of text characters ending in the current character is matched with a stored string from the FSA model, the set of probabilities stored with the matched string in the FSA model is associated with the current character. In general, for an embodiment using words of any length and n-grams, the probability values which may be associated with the current character include: (I) the probability that each word, defined by consecutive characters of text ending in the current character, ends a word; (ii) the probability that each word, defined by consecutive characters of text ending in the current character, begins a word ( equal to the probability that the same word ends a word); (iii) the probability that each n-gram, defined by consecutive characters of text ending in the current character, ends a word; and, (iv) the probability that each n-gram, defined by consecutive characters of text ending in the current character, begins a word.

In a preferred embodiment for the English language, the words are one and two character words and the n-grams are trigrams. In the preferred embodiment, each successive character of text is subject to analysis to produce up to six probability values:

1. The probability that the trigram, defined by three consecutive characters of text ending in the current character, ends a word.
2. The probability that the two-character word, defined by two consecutive characters of text ending in the current character, ends a word.
3. The probability that the one-character word, defined as the current character, ends a word.
4. The probability that the trigram, defined by three consecutive characters of text ending in the current character, begins a word
5. The probability that the two-character word, defined by two consecutive characters of text ending in the current character, begins a word (equal to the probability that the same two-character word ends a word)
6. The probability that the one-character word, defined as the current character, begins a word (equal to the probability that the same one-character word ends a word)

In this description and the accompanying claims, the probability that a string ends a word will be referred to as a "word-final probability" and the probability that a string begins a word will be referred to as a "word-initial probability". As used in this description and the following claims, a "candidate word-initial boundary" is a character in the text with at least one word-initial probability and a "candidate word-final boundary" is a character in the text with at least one word-final probability. A "candidate word boundary" is defined by an adjacent word-initial boundary and word-final boundary. Indeed, an embodiment of the invention is to utilize probability data to determine whether a candidate word-initial boundary and a candidate word-final boundary coincide and hence define a candidate word boundary.

The probabilities associated with each character in the text are recorded in a table. Table 1 shows the results for the example text "badwordme" using an FSA model with one and two character words and trigrams. The left hand column includes the characters occurring in the text. The right hand column includes the probability data associated with the input character obtained by a lookup in the FSA model as described above. In each pair of parentheses, is first, the number of characters of the string matched and second, a probability associated with the matched string. In a preferred embodiment, the word-final probabilities are represented as positive values and the word-initial probabilities are represented as negative values. For example, the character "a" has a word-final probability for a one character word (19878) and a word-initial probability for a one character word (−19878). The character "r" has four probability values (two probability pairs) stored in the table. The character "r" has a word-initial probability and a word-final probability for both a two character word (1776, −1776) and a trigram (1,−6388).

Table 2 is a reorganization of the data in Table 1 showing the candidate word-initial boundaries and candidate word-final boundaries. In Table 2, the probabilities associated with each character in the text are shown broken out separately for each type of probability. In this example, there are three word-initial probabilities and three word-final probabilities. In general, the table will include a word-initial probability column for each length word and n-gram used and a word-final probability column for each length word and n-gram used. In Table 2, the words are one and two character words and the n-grams are trigrams.

In constructing Table 2 from Table 1, the word-final probabilities remain associated with the character with which they are associated in Table 1. Hence, the word-final probability for the character "a", namely 19878, is shown in the "a" row of Table 2 as the 1-character word-final probability. Similarly, the trigram word-final probability, 391, for the first "d" in Table 1, is in the first "d" row of Table 2 as the trigram word-final probability.

On the other hand, the word-initial probabilities in Table 2 are associated with the character beginning the string in question. Hence, the trigram word-initial probability associated with the first "d" in Table 1, namely −555, is reproduced in Table 2 in the row for the beginning character of the trigram, namely "b". Similarly, the trigram word-initial probability associated with the "o" in Table 1, namely −1, is reproduced in Table 2 in the row for the beginning character of the trigram, namely, the first "d".

TABLE 1

Information returned by the FSA for the text "badwordme"

| Input Character | Lengths and Probability Pairs |
|---|---|
| b | None |
| a | (1,19878), (1,−19878) |
| d | (3,391), (3,−555) |
| w | None |
| o | (3,−1) |
| r | (2,1776), (2,−1776), (3,1), (3,−6388) |
| d | (3,1557), (3,−1776) |
| m | None |
| e | (2,8019), (2,−8019), (3,3), (3,−1) | final boundary, thereby identifying a candidate word boundary. In describing FIGS. 1A–1E, reference will be made to Tables 1 and 2 for the example text "badwordme" to more clearly illustrate the method of identifying word boundaries. The application of a preferred embodiment of the invention to the text "badwordme" will be discussed in full detail following the description of FIGS. 1A–1E.

Figure 1B:
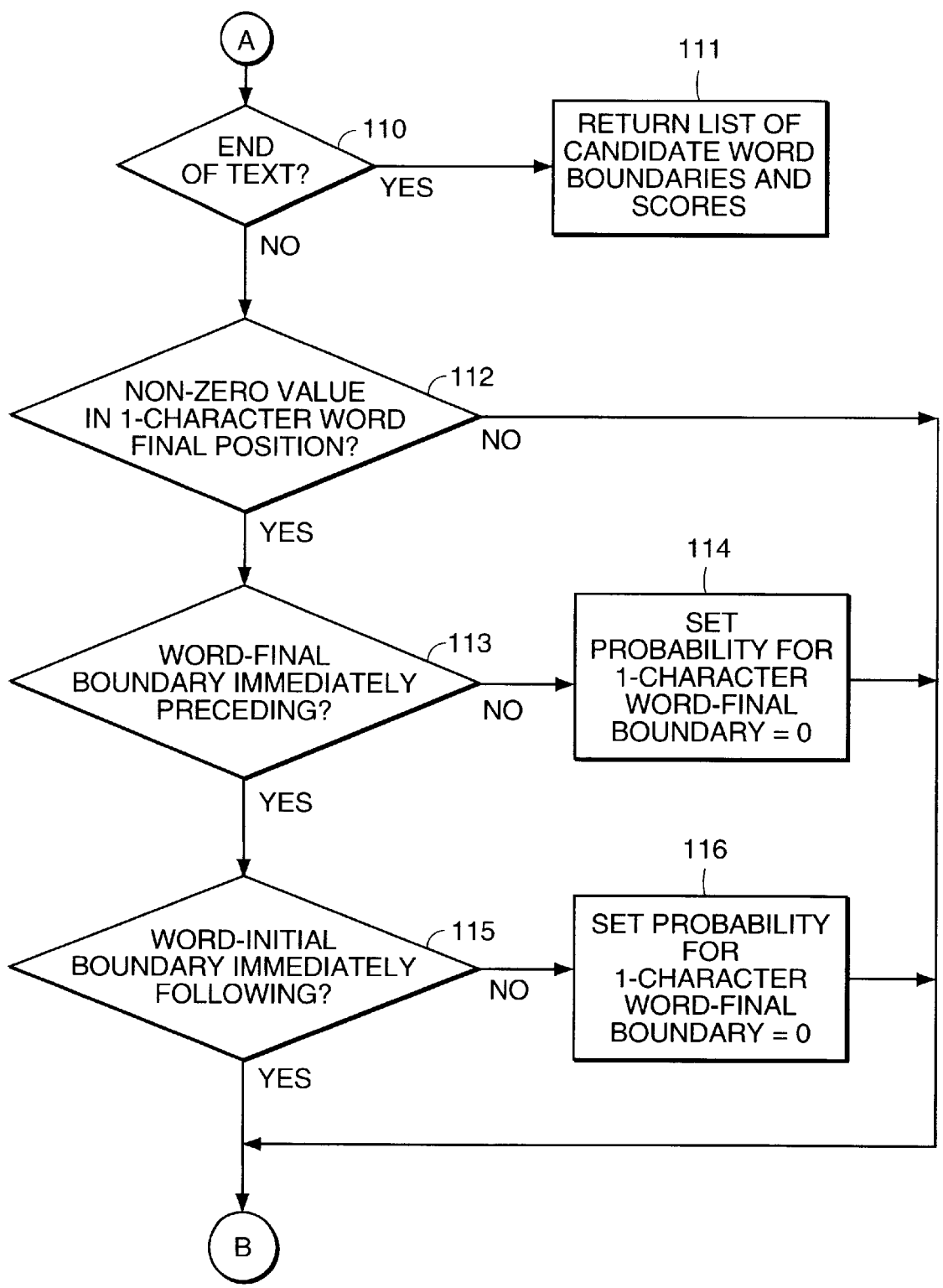

Returning to FIG. 1A, in order to segment the input text, the text must end in possible word-final characters in steps 104–106 and begin with possible word-initial characters in steps 107–109. In other words, the last character in the text must have at least one word-final probability value and the first character in the text must have at least one word-initial probability value. The example text "badwordme" may be segmented because, as shown in Table 2, the first character "b" has at least one word-initial probability and the last character "e" has at least one word-final probability. If there is at least one word-final probability value for the last character in the text in step 105 and there is at least one word initial probability value for the first character in the text in step 108, then processing continues as shown in FIG. 1B. If there is not at least on word-final probability value for the last character in the text and at least one word-initial boundary for the first character in the text, then the processing ends in steps 106 and 109.

In FIGS. 1B–1E, a word boundary check is performed for each candidate word-final boundary in the continuous text. For example, the text "badwordme" has five candidate word-final boundaries, namely "a", "d", "r", "d", and "e", as shown in Table 2. During the word boundary check, candidate word boundaries are identified and a word boundary score is calculated for each candidate word boundary. A candidate word boundary is defined by an adjacent word-initial boundary and word-final boundary. The word boundary score is calculated using the word-initial probabilities and word-final probabilities associated with the word-initial boundary and the word-final boundary which define the candidate word boundary.

In FIG. 1B, if the candidate word-final boundary being processed is the end of the text (i.e., the last character of the text) in step 110, a list of candidate word boundaries and word boundary scores are returned in step 111. If the candidate word final boundary being processed is not the end of the text in step 110, processing continues with steps 112–116. In steps 112–116, a one character word-final check is performed on the current candidate word-final boundary being processed.

TABLE 2

Information stored in the word boundary array using values from Table 1

| character | 1-character word-final | 2-character word-final | trigram word-final | 1-character word-initial | 2-character word-initial | trigram word-initial |
|---|---|---|---|---|---|---|
| b | 0 | 0 | 0 | 0 | 0 | −555 |
| a | 19878 | 0 | 0 | −19878 | 0 | 0 |
| d | 0 | 0 | 391 | 0 | 0 | −1 |
| w | 0 | 0 | 0 | 0 | 0 | −6388 |
| o | 0 | 0 | 0 | 0 | −1776 | −1766 |
| r | 0 | 1776 | 1 | 0 | 0 | 0 |
| d | 0 | 0 | 1557 | 0 | 0 | −1 |
| m | 0 | 0 | 0 | 0 | −8019 | 0 |
| e | 0 | 8019 | 3 | 0 | 0 | 0 |

Figure 1C:
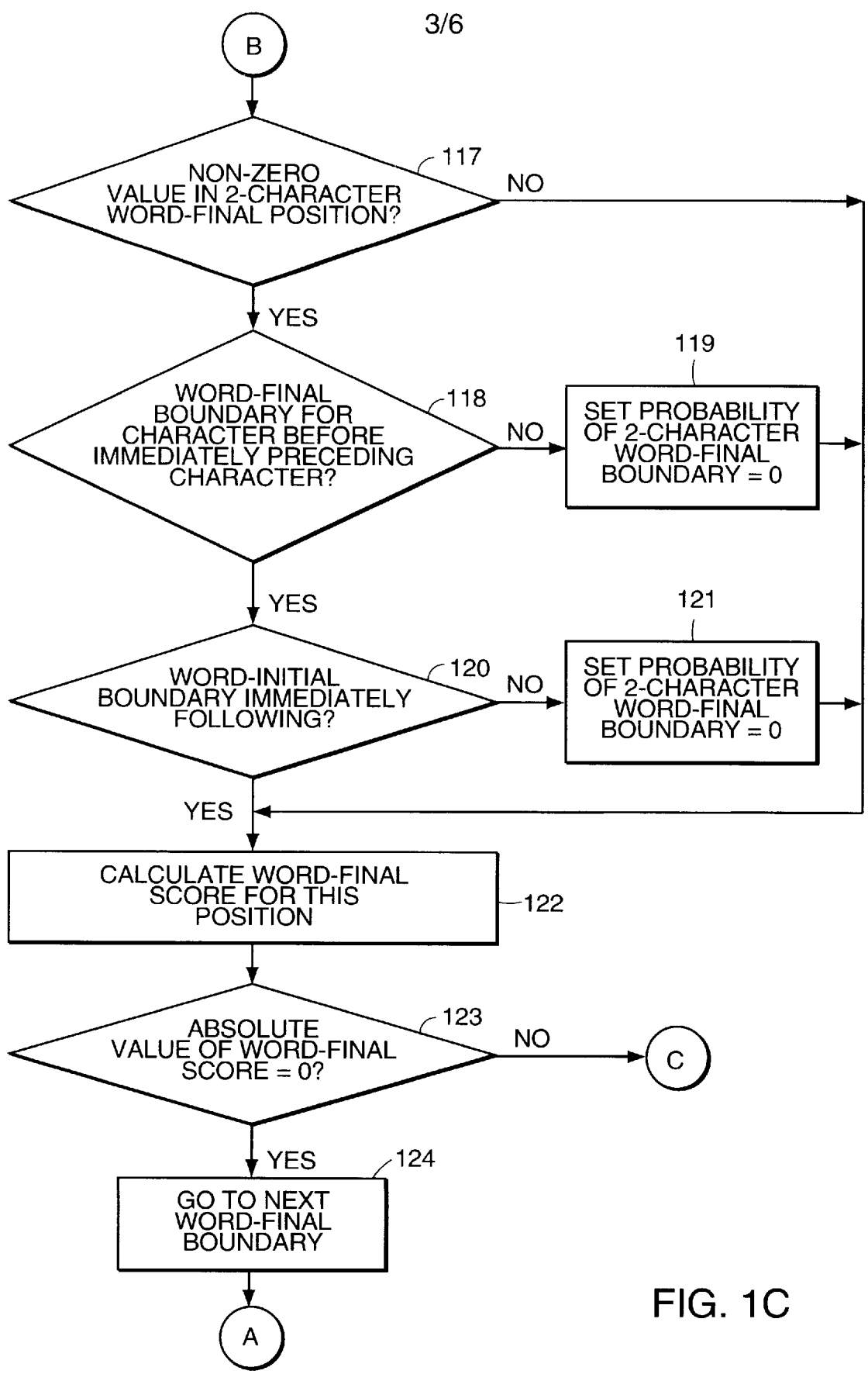

The processing described below has the effect of utilizing data of the kind shown in Table 2 to identify the coincidence of a candidate word-initial boundary and a candidate word- In step 112, if there is not a non-zero value in the one character word-final position, processing continues to a two character word-final check as shown in FIG. 1C. For example, the candidate word-final boundary "a", has a non-zero value in the one-character word final position, namely 19878, as shown in Table 2. Since there is a non-zero value, then it is determined whether there is a word-final probability value for the character immediately preceding the current character in step 113. For the candidate word-final boundary "a", the character immediately preceding the "a" is the "b". In step 113, if there is not a word-final probability value for the immediately preceding character, the probability value for the one-character word-final position for the current character is set to zero in step 114 and processing continues as shown in FIG. 1C. For example, the "b" does not have a word-final probability as shown in Table 2, therefore, the one character word-final probability for the "a" is set to zero and processing continues with the steps as shown in FIG. 1C.

If, however, there is a word-final probability value for the immediately preceding character, it is determined whether there is a word-initial probability value for the character immediately following the current character in step 115. If there is not a word-initial probability value for the immediately following character, then the probability value for the one character word-final position is set to zero in step 116 and processing continues as shown in FIG. 1C. If there is a word-initial probability value for the immediately following character, then the probability value for the one character word-final position remains the same and processing continues as shown in FIG. 1C.

FIG. 1C shows the steps for a two character word-final check in steps 117–119. First, it is determined whether there is a non-zero value in the two character word-final position in step 117. If there is not a non-zero value, then the processing continues with step 122. For example, the candidate word-final boundary "a" has a zero value for the two character word-final position, as shown in Table 2, therefore, processing will continue with step 122. If there is a non-zero value, then it is determined if there is a word final probability value for the character before the immediately preceding character in step 118. For example, the candidate word-final boundary "r" has a non-zero value for the two character word-final position, namely 1776, as shown in Table 2. The character before the immediately proceeding character is the "w". The "w" does not have a word-final probability value as shown in Table 2, therefore, the probability value for the two character word final position for the "r" is set to zero in step 119 and processing continues with step 122. If, however, there is a word-final probability value in step 118 for the character before the immediately proceeding character, it is determined whether there is a word-initial probability value for the character immediately following the current character in step 120. If there is not a word-initial probability value for the immediately following character, then the probability value for the one character word-final position is set to zero in step 121 and processing continues with step 122. If there is a word-initial probability value for the immediately following character, then the probability for the two character word final position remains the same and processing continues with step 122.

In general, for an embodiment using words of any length, a j-character word-final check would be performed for each word of length j ending at a given position. First, it would be determined if there is a non-zero probability value in the j-character word-final position for the current character being processed. If there is not a non-zero value, then processing continues. If there is a non-zero value, then it is determined if there is a word-final probability value on the character j characters before the current character. If there is not a word-final probability value on the character j characters before, then the probability for the j-character word-final position is set to zero and the processing continues. If there is a word-final probability value for the character j characters before the current character, it is determined whether there is a word-initial probability for the character immediately following the current character. If there is not a word-initial probability for the character immediately following the current character, the probability for the j-character word-final position of the current character is set to zero. If, however, there is a word-initial probability for the character immediately following the current character, then the probability for the j-character word-final position remains the same and processing continues. The above steps are repeated for each word length. After the final j-character word-final check processing will continue with step 122 in FIG. 1C.

Figure 1D:
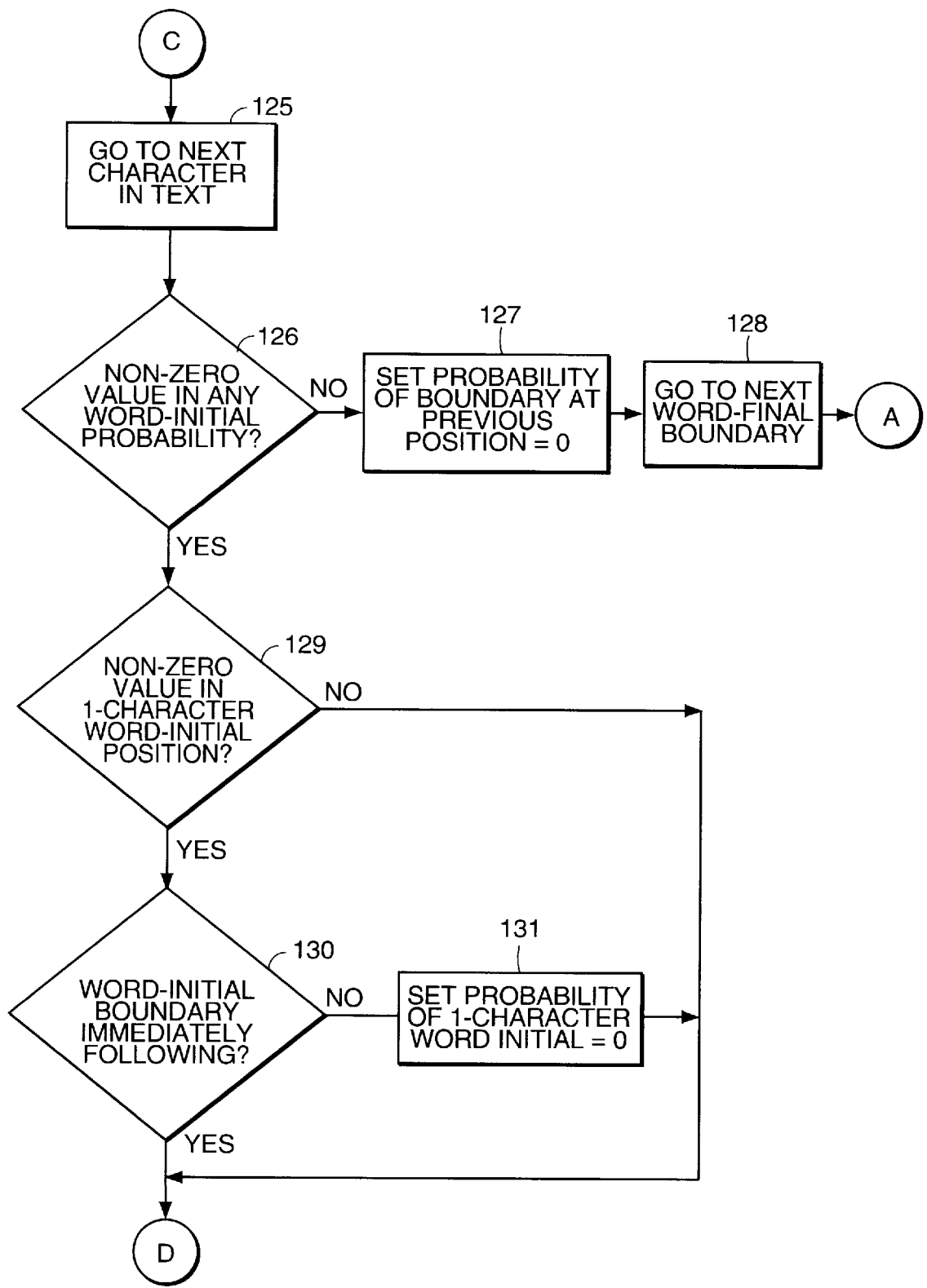

Returning to FIG. 1C, a word-final score is then calculated for the current position (i.e. the current candidate word-final boundary being processed) in step 122. The word-final score is calculated by summing the word-final probability values for the current character being processed. For example, the word-final score for the candidate word-final boundary "a" will be the sum of the three word-final probability values. It is important to note that, as discussed above, the one-character word-final probability of the "a" will be set to zero based on the one-character word-final check analysis. Therefore, the word-final score for the "a" will be zero. If the absolute value of the word final score is zero in step 123, then the process moves to the next word-final boundary in step 124 and processing returns to step 110 in FIG. 1B. If the absolute value of the word-final score is greater than zero, a word-initial check is then performed on the next consecutive character in the text after the candidate word-final boundary as shown in FIG. 1D. The word-initial check determines whether the next character in the text after the candidate word-final boundary is a candidate word-initial boundary. For example, if the word-final score for the "a" had not been zero, then a word-initial check would be performed on the next character in the text, namely the first "d". The first "d" does have a word-initial probability value (−1), as shown in Table 2, and would therefore, be a candidate word-initial boundary.

If there is a non-zero value for any word-initial probability for the next consecutive character in the text in step 126, then the processing continues with step 129. For example, the "w" has a non-zero trigram word-initial probability, as shown in Table 2 and will be processed to determine if it is a valid word-initial boundary. If there is not a non-zero word-initial probability value, then the word-final score of the previous position is set to zero in step 127, and process moves to the next candidate word-final boundary in step 128 and processing returns to step 110 in FIG. 1B.

Figure 1E:
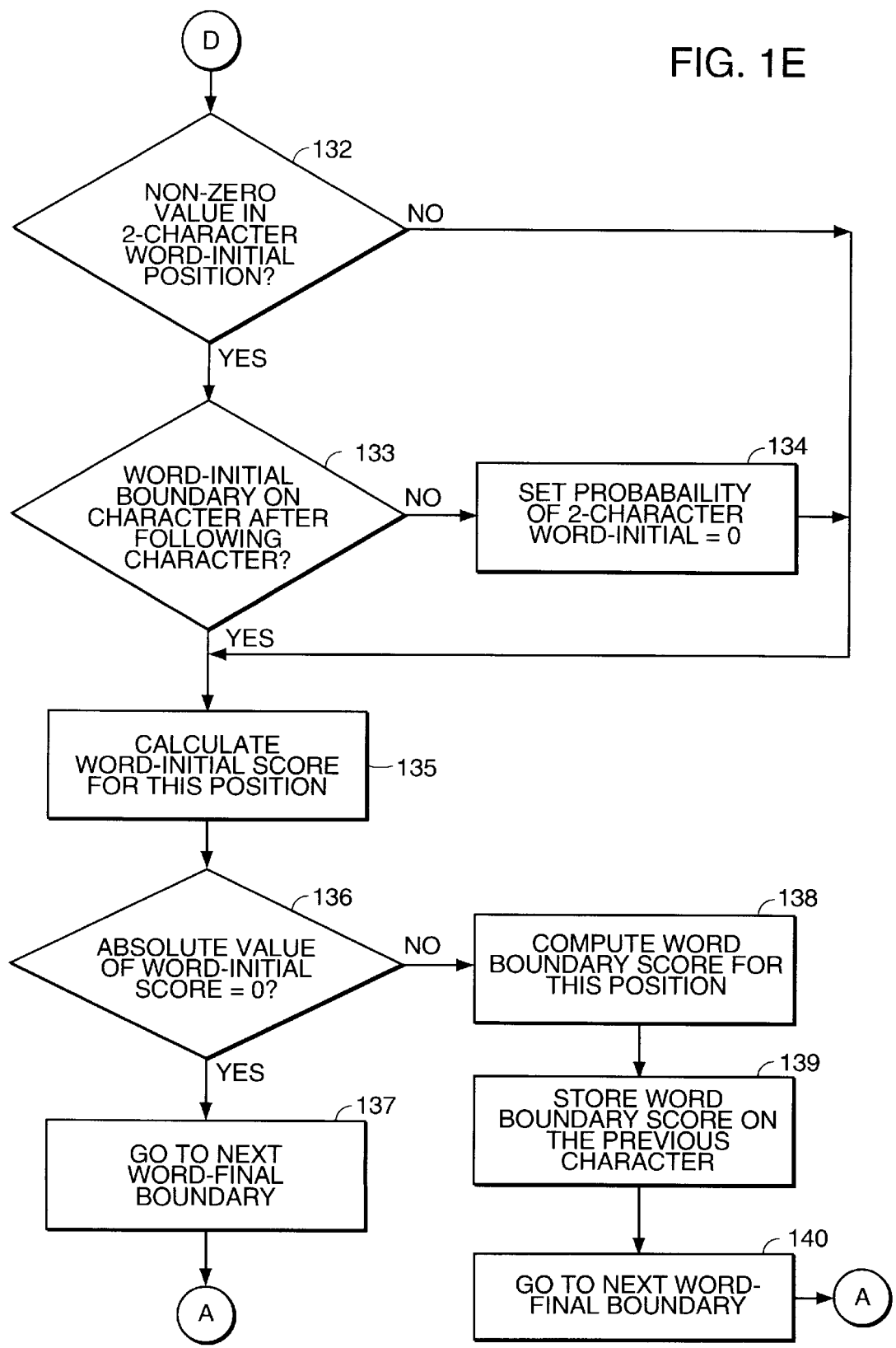

In FIG. 1D in steps 129–131, a one character word-initial check is performed on the current character. It is important to note that the current character is now the character immediately following the candidate word-final boundary (see step 125). First, it is determined if there is a non-zero value for the one character word-initial position for the current character in step 129. If there is not a non-zero value, the processing continues to a two character word-initial check as shown in FIG. 1E. For example, the "w" has a zero value for the one character word-initial position in Table 2, therefore, the processing will continue to FIG. 1E. If there is a non-zero value, it is determined whether there is a word-initial probability value on the immediately following character in step 130. If there is not a word-initial probability on the immediately following character, then the probability value of the one character word initial position is set to zero in step 131 and processing continues as shown in FIG. 1E. If there is a word-initial probability value, then the probability value for the one character word-initial position remains the same and processing continues as shown in FIG. 1E.

FIG. 1E shows the steps for the two-character word-initial check. First, it is determined whether there is a non-zero value for the two character word-initial position in step 132. If there is not a non-zero value, the processing continues with step 135. For example, the "w" has a zero value in the two character word-initial position in Table 2, therefore, processing will continue with step 135. If there is a non-zero value, it is determined whether there is a word-initial probability value on the character after the immediately following character in step 138. If there is a word-initial probability value, the probability value for the two character word-initial position for the current character remains the same and processing continues with step 135. If there is not a word initial probability value, the probability value of the two character word-initial position for the current character is set to zero in step 134 and processing continues with step 135.

In general, for an embodiment with words of any length, a j-character word-initial check is performed for each word of length j. First, it is determined whether there is a non-zero value for the j-character word-initial position for the current character. If there is not a non-zero value, then processing continues. If there is a non-zero value, it is determined whether there is a word initial probability value on the character j-characters after the current character. If there is a word-initial probability value, the probability value for the j-character word initial position remains the same and processing continues. If there is not a word-initial probability value, the probability value of the j-character word-initial position is set to zero and processing continues. The above steps are repeated for each word length for all words identified as ending at the given character. After the final j-character word-initial check, processing continues with step 135.

As shown in FIG. 1F, in step 135 a word-initial score is calculated for the current character. The word-initial score is calculated by summing the word initial probability values for the character being processed. For example, the word-initial score for the candidate word-initial boundary "w" will be the sum of the three word-initial probability values. The word-initial score for the "w" will be −6388. If the absolute value of the word initial score is zero in step 136, then the process moves to the next candidate word-final boundary in step 137 and processing returns to step 110 in FIG. 1B. If the absolute value of the word-initial score is greater than zero in step 136, then a word boundary score is calculated for this position in step 138. The word boundary score is calculated by multiplying the word-final score for the previous character (the candidate word-final boundary) with the absolute value of the word-initial score for the current character (the next consecutive character in the text after the candidate word-final boundary). For example, the word boundary score for a candidate word boundary between the first "d" and the "w" is calculated by multiplying the word-final score for the first "d" by the word-initial score for the "w". In step 139, the word boundary score is stored with the previous character (the candidate word-final boundary). For the previous example, the word boundary score will be stored with the first "d". The process then moves to the next candidate word-final boundary in the text in step 140 and processing continues with step 110 in FIG. 1B. Returning to FIG. 1B, if the next candidate word-final boundary is the last character of the text in step 110, a list of candidate word boundaries and their associated scores is returned in step 111.

As mentioned above, Tables 1 and 2 show results for the example continuous text "badwordme". This example illustrates a preferred embodiment of the method using one and two character words and trigrams. References will be made to the corresponding steps from FIGS. 1A–1E. First, the last character "e" of the text is checked to make sure it has at least one word-final probability value (steps 104–105). In this example, the "e" has a non-zero probability value (8019) in the 2-character word-final position, as shown in Table 2. Next, the first character in the text "b" is checked to make sure it has at least one word-initial probability value (steps 107–108). As shown in Table 2, the "b" has a non-zero value (−555) in the 3 character word initial position. Therefore, the text may be segmented.

The first candidate word-final boundary is on the "a" as shown in Table 2. The "a" is not the end of the text, therefore, processing may continue (step 110). First, the one-character word-final position for the "a" is checked (step 112). There is a non-zero value (19878) so the immediately preceding character, "b", is inspected to determine if the "b" has a word-final probability value (step 113). The "b" does not have a word-final probability value (see Table 2), so the one character word-final value on the "a" is set to zero (step 114).

Next, the two character word-final check is performed on the "a" (FIG. 1C, steps 117–121). There is zero value in the two character word-final position (step 117), so a word-final score is calculated for the "a" (step 122). The word-final score is equivalent to the sum of the three word final probabilities for the "a". In this example, the word-final score for the "a" is zero because the one character word-final probability was set to zero. Since the word-final score is not greater than zero (step 123), processing moves to the next word-final boundary (step 124) and a word-boundary check is performed.

The next candidate word-final boundary is on the first "d" (see Table 2). The first "d" is not the end of the text (FIG. 1B,step 110), therefore, processing may continue. The one character word-final position has a zero value (step 112), therefore processing continues with the two character word final check (FIG. 1C, step 117). The two character word-final position also has a zero value (step 117). Therefore, a word-final score is calculated for the first "d" (step 122). The word-final score for the first "d" is 391. Since the absolute value of the word-final score is greater than zero, processing continues with the word initial check (steps 125–126, FIG. 1D). The word-initial check is performed on the next consecutive character in the text ("w"). The "w" has a non-zero value in one of the word-initial positions in Table 2 (step 126), therefore, processing continues with a one character word-initial check (steps 129–131).

The "w" does not have a one character word-initial probability value (step 129), therefore, processing continues with a two character word-initial check (steps 132–134, FIG. 1E). The two character word initial probability value for the "w" is zero, therefore, a word-initial score is calculated for the "w" (step 135). The word-initial score is calculated by summing the three word initial probability values for the "w". The word-initial score for the "w" is −6388.

Since the absolute value of the word-initial score (6388) is greater than zero (step 136), a word boundary score for the candidate word boundary between the "d" and "w" is calculated (step 138) by multiplying the probability of a word final boundary on the "d" (391) by the absolute value of the probability of a word initial boundary on the "w" (6388). The resulting word boundary score is associated with the "d" (step 139).

The next candidate word-final boundary in the text is the "r". The "r" is not the end of the text (step 110, FIG. 1B), therefore, processing may continue. The one character word-final position has a zero value (step 112). There is a non-zero value in the two character word final position (step 117, FIG. 1C), therefore, the probability values on the "w" (the character before the preceding character) are checked to see if there are any word-final probability values (step 118). There are no word-final probability values for the "w", so the two character word-final probability value on the "r" is set to zero (step 119). A word-final score is then calculated for the "r" (step 122). The word-final score for the "r" is one. Since the absolute value of word-final score for the "r" is greater than zero (step 123), the word initial check is performed on the next consecutive character in the text, the second "d".

The second "d" has a non-zero value in one of the word initial positions in Table 2 (step 126, FIG. 1D). Both the one character (step 129) and two character (step 132, FIG. 1E) word-initial positions have zero values, therefore, a word-initial score is calculated for the second "d" (step 135). The word-initial score for the second "d" is one. Since the absolute value of the word initial score is greater than zero (step 136), a word boundary score is calculated for the candidate word boundary between the "r" and the "d" by multiplying the word final score from the "r" and the absolute value of the word initial score from the "d" (step 138). The word boundary score is one. The resulting word boundary score is associated with the "r" (step 139).

The next candidate word-final boundary the second "d". The second "d" is not the end of the text (step 110, FIG. 1B), therefore, processing may continue. Both the one character (step 112) and two character (step 117, FIG. 1C) word-final positions have zero values, so a word-final score is calculated for the second "d" (step 122). The word-final score for the second "d" is 1557. Since the absolute value of the word-final score is greater than zero (step 123), a word initial check is performed on the next consecutive character in the text, "m".

The "m" has a word-initial probability value (step 126, FIG. 1D), so processing continues with a one character word-initial check (steps 129–131). The one character word-initial position has a zero value (step 129). There is, however, a non-zero value in the two character word initial position (step 132, FIG. 1E), therefore, the probability values of the character after the immediately following character are checked to determine if that character has a non-zero word-initial probability value. The end of the text is one character after the "m", so the two character word initial boundary on "m" is valid. A word-initial score is calculated for the "m" (step 135). The word initial score for the "m" is −8019. Since the absolute value of the word-initial score is greater than zero (step 136), a word boundary score is calculated for the candidate word boundary occurring between the "d" and the "m" (step 138). The word boundary score is determined by multiplying the word-final score on the second "d" (1557) by the absolute value of the word initial score on the "m" (8019). The resulting word boundary score is associated with the second "d" (step 139).

The next candidate word final boundary is on the "e". The "e" is the last character of the text (step 110, FIG. 1B), therefore, the process halts. A list of the candidate word boundaries and scores are returned (step 111). In this example, there are three candidate word boundaries:

1. Between the first "d" and the "w"
2. Between the "r" and the second "d"
3. Between the second "d" and the "m"

In a preferred embodiment, the results of the word boundary identification method are submitted to a chart parser. The chart parser may be one of general use in the art, for example, Norvig, P., "Techniques for Automatic Memoization with Applications to Context-Free Parsing," *Computational Linguistics* 17(1) 1991, pp91–98; Winograd, T., "Charts and the active chart parser," *Language as a Cognitive Process*, v 1, pp 116–128 (Addison-Wesley 1983). The foregoing references are herein incorporated by reference. The chart parser looks up the segments identified by the highest scoring candidate word boundary to the lowest scoring candidate word boundary in a lexicon to verify the segments.

Figure 2:
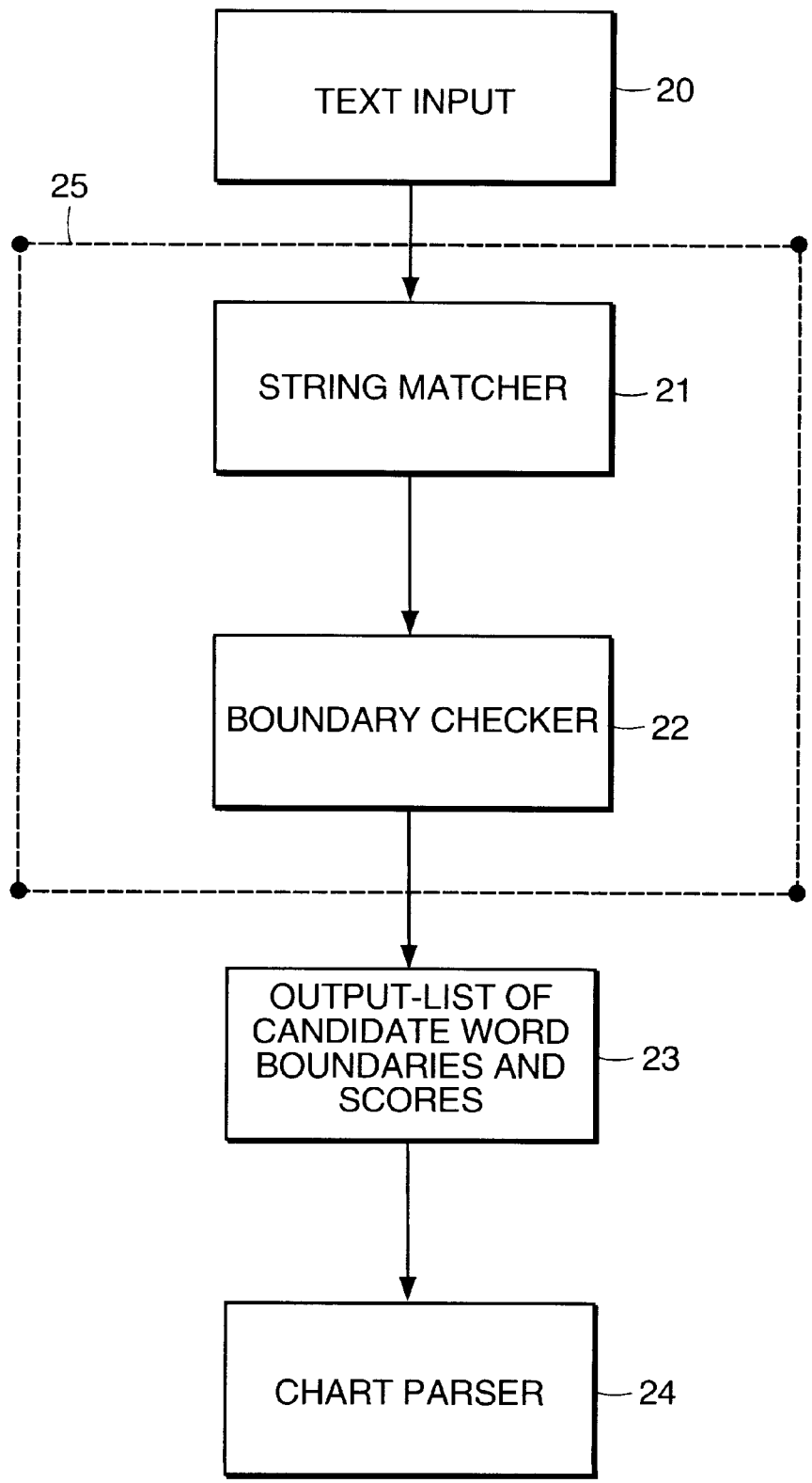
FIG. 2 is a block diagram showing a device for identifying word boundaries in accordance with an embodiment of the invention.

FIG. 2 is a block diagram showing a device for identifying word boundaries in accordance with an embodiment of the invention. The text input 20 is processed by the word boundary identifier 25 to identify candidate word boundaries in the continuous text. The word boundary identifier 25 includes a string matcher 21 coupled to a boundary checker 22. The string matcher 21 compares the text to a stored list of varying length strings in order to identify candidate word-initial and word-final boundaries in the text. In a preferred embodiment, the varying length strings include words and n-grams. In a further preferred embodiment for the English language, the varying length strings include one and two character words and trigrams. Each stored string has an associated set of probabilities. As discussed with respect to FIG. 1, the strings and their associated probabilities may be implemented using a single Aho-Corasick finite-state automaton model. The string matcher matches a current character in the text together with a number (which may be zero) of immediately proceeding characters against the stored list of strings. The process of identifying candidate word-initial boundaries and candidate word-final boundaries is described in detail above with respect to FIGS. 1A–1E.

The probability values associated with each candidate word-initial and word-final boundary identified by the string matcher 21 are used by the boundary checker 22 to identify candidate word boundaries. As discussed previously a "candidate word boundary" is defined by an adjacent word-initial boundary and word-final boundary. The boundary checker 22 calculates a word boundary score for each candidate word boundary using the probabilities associated with the word-initial boundary and word-final boundary which define each candidate word boundary.

The word boundary identifier 25 returns a list of the candidate word boundaries and score as an output 23. The output 23 is then sent to a chart parser 24. The chart parser 24 verifies the candidate word boundaries by looking up each segment defined by the candidate word boundaries in a lexicon from the highest scoring word boundary to the lowest scoring word boundary. As discussed previously, the chart parser may be one of general use in the art.

What is claimed is:

1. A computerized method for identifying word boundaries in a continuous text input, the method comprising the following digital processes:

(a) comparing the continuous text to a set of varying length strings to identify candidate word-initial boundaries and candidate word-final boundaries in the continuous text, each candidate word-initial boundary and candidate word-final boundary being a character in the continuous text and having an associated probability value;

(b) identifying each candidate word boundary in the continuous text by calculating a word boundary score for such candidate word boundary using the probability values associated with the candidate word-initial boundaries and candidate word-final boundaries identified in step (a), the candidate word boundaries defining segments of the continuous text; and (c) verifying each segment defined by the candidate word boundaries identified in step (b) against a string database.

2. A method according to claim 1, wherein the set of varying length strings includes words.

3. A method according to claim 1, wherein the set of varying length strings includes words and n-grams.

4. A method according to claim 3, wherein the words are one and two character words and the n-gams are trigrams.

5. A method according to claim 3, wherein the probability value associated with a candidate word-initial boundary is the probability the string, beginning with the candidate word-initial boundary, begins a word.

6. A method according to claim 5, wherein the probability value associated with a candidate word-final boundary is the probability that the string, ending with the candidate word-final boundary, ends a word.

7. A computerized data processing device for identifying word boundaries in a continuous text input, the device comprising:

a string comparator, to identify candidate word-initial boundaries and candidate word-final boundaries in the continuous text by comparing the continuous text to a set of varying length strings, each candidate word-initial boundary and candidate word-final boundary being a character in the continuous text and having an associated probability value;

a boundary checker, coupled to the string comparator, to identify each candidate word boundary in the continuous text by calculating a word boundary score for such candidate word boundary using the probability values associated with the candidate word-initial boundaries and candidate word-final boundaries identified by the string comparator, the candidate word boundaries defining segments of the continuous text.

8. A device according to claim 7, further comprising:

a string database; and a chart parser, coupled to the boundary checker, to verify each segment defined by the candidate word boundaries identified by the boundary checker against the string database.

9. A device according to claim 7, wherein the set of varying length strings includes words.

10. A device according to claim 7, wherein the set of varying length strings includes words and n-grams.

11. A device according to claim 10, wherein the words are one and two character words and the n-grams are trigrams.

12. A device according to claim 10, wherein the probability value associated with a candidate word-initial boundary is the probability that the string, beginning with the candidate word-initial boundary, begins a word.

13. A device according to claim 12, wherein the probability value associated with a candidate word-final boundary is the probability that the string, ending with the candidate word-final boundary, ends a word.

14. A digital storage medium encoded with instructions which, when loaded into a computer, establishes a device for identifying word boundaries in continuous text, the device including:

a string comparator, to identify candidate word-initial boundaries and candidate word-final boundaries in the continuous text by comparing the continuous text to a set of varying length strings, each candidate word-initial boundary and candidate word-final boundary being a character in the continuous text and having an associated probability value; and a boundary checker, coupled to the string comparator, to identify each candidate word boundary in the continuous text by calculating a word boundary score for such candidate word boundary using the probability values associated with the candidate word-initial boundaries and candidate word-final boundaries identified by the string comparator, the candidate word boundaries defining segments of the continuous text.

15. A storage medium according to claim 14, the device further including:

a string database; and a chart parser, coupled to the boundary checker, to verify each segment defined by the candidate word boundaries identified by the boundary checker against the string database.

16. A digital storage medium according to claim 14, wherein the set of varying length strings includes words.

17. A storage medium according to claim 14, wherein the set of varying length strings includes words and n-grams.

18. A storage medium according to claim 17, wherein the words are one and two character words and the n-grams are trigrams.

19. A storage medium according to claim 17, wherein the probability value associated with a candidate word-initial boundary is the probability that the string, beginning with the candidate word-initial boundary, begins a word.

20. A storage medium according to claim 19, wherein the probability value associated with a candidate word-final boundary is the probability that the string, ending with the candidate word-final boundary, ends a word.

* * * * *

UNITED STATES PATENT AND TRADEMARK OFFICE
CERTIFICATE OF CORRECTION

| | |
|---|---|
| PATENT NO. | : 6,185,524 B1 |
| DATED | : February 6, 2001 |
| INVENTOR(S) | : Alwin B. Carus and Kathleen Good |

It is certified that error appears in the above-identified patent and that said Letters Patent is hereby corrected as shown below:

Title page, Item [54] Title of Invention,
Replace "METHOD AND APPARATUS FOR AUTOMATIC IDENTIFICATION OF WORD BOUNDARIES IN CONTINUOUS TEXT AND COMPUTATION OF WORD BOUNDARY SCORES" with
-- METHOD AND APPARATUS FOR AUTOMATIC INDENTIFICATION OF WORD BOUNDARIES IN CONTINUOUS TEXT --.

Signed and Sealed this

Twenty-third Day of October, 2001

*Attest:*

NICHOLAS P. GODICI
*Attesting Officer*     *Acting Director of the United States Patent and Trademark Office*